US012810319B2

(12) United States Patent
Wasacz

(10) Patent No.: US 12,810,319 B2
(45) Date of Patent: Nov. 24, 2026

(54) SYSTEM AND METHOD FOR PROVIDING ELECTRIC VEHICLE DRIVE MODE COST

(71) Applicant: FCA US LLC, Auburn Hills, MI (US)

(72) Inventor: Bryon E Wasacz, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 112 days.

(21) Appl. No.: 18/812,237

(22) Filed: Aug. 22, 2024

(65) Prior Publication Data

US 2026/0057403 A1 Feb. 26, 2026

(51) Int. Cl.

| | |
|---|---|
| ***G06Q 30/0201*** | (2023.01) |
| ***B60L 58/10*** | (2019.01) |
| ***B60W 30/182*** | (2020.01) |
| ***B60W 50/14*** | (2020.01) |
| ***G06Q 50/06*** | (2024.01) |
| ***H04W 4/40*** | (2018.01) |

(52) U.S. Cl.

CPC .......... *G06Q 30/0206* (2013.01); *B60L 58/10* (2019.02); *B60W 30/182* (2013.01); *B60W 50/14* (2013.01); *G06Q 50/06* (2013.01); *H04W 4/40* (2018.02); *B60W 2530/20* (2013.01)

(58) Field of Classification Search

None

See application file for complete search history.

(56) References Cited

U.S. PATENT DOCUMENTS

| | | | | |
|---|---|---|---|---|
| 10,596,902 | B2 * | 3/2020 | Lim | B60K 23/0808 |
| 11,685,366 | B2 * | 6/2023 | Maddi Reddy | B60W 10/08 701/70 |
| 12,115,880 | B2 * | 10/2024 | Diamond | G01C 21/3889 |
| 12,358,329 | B2 * | 7/2025 | Prabhakara | B60C 19/00 |
| 2022/0194254 | A1 * | 6/2022 | Gupta | B60L 53/305 |
| 2024/0181816 | A1 * | 6/2024 | Katsuno | G01M 17/02 |
| 2024/0192093 | A1 * | 6/2024 | Singh | B60C 11/246 |
| 2024/0227460 | A9 * | 7/2024 | Stalnaker | B60C 23/0488 |
| 2024/0232961 | A9 * | 7/2024 | Bootz | G06Q 30/0283 |
| 2025/0052567 | A1 * | 2/2025 | Bartolotto | B60C 25/007 |

* cited by examiner

*Primary Examiner* — Todd Melton

(74) *Attorney, Agent, or Firm* — Jeremy J. Klobucar

(57) ABSTRACT

A vehicle system for an electrified vehicle that provides cost information for operating the electrified vehicle in a drive mode includes an electric traction motor configured to provide drive torque to a plurality of wheels, a high voltage battery system configured to power the electric traction motor, one or more sensors configured to monitor tire wear of each wheel of the plurality of wheels, and a human machine interface (HMI) configured to provide a plurality of user selectable drive modes. A controller is configured to detect a user selected drive mode, receive tire cost data for each wheel, receive tire wear data from the one or more sensors, determine a tire wear cost for operating the electrified vehicle in the user selected drive mode, based on the tire cost data and the tire wear data, and display the tire wear cost on the HMI.

20 Claims, 5 Drawing Sheets

SYSTEM AND METHOD FOR PROVIDING ELECTRIC VEHICLE DRIVE MODE COST

FIELD

The present disclosure relates generally to electric vehicles and, more particularly, to a system for estimating a cost of operating an electric vehicle in various drive modes.

BACKGROUND

Because electric vehicles (EVs) do not have conventional drivelines, their electric motor(s) may be controlled in ways to enable new drive features for the automotive market. For example, some vehicles may allow a driver to select a particular mode of operation to perform a specialized maneuver. In one example, to increase performance of a vehicle launch, a burnout mode may be selected to allow the driver to perform a controlled spinning of the rear tires, which warms the tires and improves grip with the road or track surface. However, it is difficult for the driver to estimate a realistic cost of operation in such modes in terms of reduced tire life and electric vehicle range. Such costs may be significant, particularly for high performance vehicles that require expensive specialty tires. Accordingly, there remains a desire for improvement in the relevant art.

SUMMARY

In accordance with one example aspect of the invention, a vehicle system for an electrified vehicle that provides cost information for operating the electrified vehicle in a drive mode is provided. The vehicle system includes an electric traction motor configured to provide drive torque to a plurality of wheels, a high voltage battery system configured to power the electric traction motor, one or more sensors configured to monitor tire wear of each wheel of the plurality of wheels, and a human machine interface (HMI) configured to provide a plurality of user selectable drive modes. A controller is configured to detect a user selected drive mode, receive tire cost data for each wheel, receive tire wear data from the one or more sensors, determine a tire wear cost for operating the electrified vehicle in the user selected drive mode, based on the tire cost data and the tire wear data, and display the tire wear cost on the HMI.

In addition to the foregoing, the described vehicle system may include one or more of the following features: wherein the user selectable drive modes are configured to intentionally induce wheel slip that can lead to accelerated tire wear; wherein the user selectable drive modes include a donut mode configured to support a rear-wheel burnout, a drift mode configured to support a vehicle drift with a maximum slip angle of a rear of the vehicle relative to the direction of travel, and a line lock mode configured to brake one or more wheels while allowing the remaining wheels to spin for warming thereof.

In addition to the foregoing, the described vehicle system may include one or more of the following features: an infotainment unit configured to access current tire cost data from a database via a network; wherein the one or more sensors includes a tire wear sensor disposed in each of a plurality of wheel wells of the electrified vehicle; wherein the tire wear cost is displayed in a currency; wherein the HMI is an instrument panel cluster.

In addition to the foregoing, the described vehicle system may include one or more of the following features: wherein the controller is further configured to monitor an energy state of the high voltage battery system, receive electricity cost data, determine an amount of energy required to perform the user selected drive mode, determine an energy cost of performing the user selected drive mode, based on the electricity cost data and the determined amount of energy required to perform the user selected drive mode, and display the determined energy cost on the HMI; an infotainment unit configured to access current electricity cost data from a database via a network; and wherein the energy cost is displayed in a currency.

In accordance with another example aspect of the invention, a method is provided for providing cost information for drive mode operation in an electrified vehicle having an electric traction motor, one or more sensors configured to monitor tire wear of vehicle wheels, and a human machine interface (HMI) configured to provide a plurality of user selectable drive modes. In one example implementation, the method includes detecting, by a controller and the HMI, a user selected drive mode; receiving, by the controller, tire cost data for each wheel; receiving, by the controller, tire wear data from the one or more sensors; determining, by the controller, a tire wear cost for operating the electrified vehicle in the user selected drive mode, based on the tire cost data and the tire wear data; and displaying, by the controller, the tire wear cost on the HMI.

In addition to the foregoing, the described method may include one or more of the following features: wherein the user selectable drive modes are configured to intentionally induce wheel slip that can lead to accelerated tire wear; wherein the user selectable drive modes include a donut mode configured to support a rear-wheel burnout, a drift mode configured to support a vehicle drift with a maximum slip angle of a rear of the vehicle relative to the direction of travel, and a line lock mode configured to brake one or more wheels while allowing the remaining wheels to spin for warming thereof.

In addition to the foregoing, the described method may include one or more of the following features: accessing, by an infotainment unit and via a network, current tire cost data from a database; wherein the one or more sensors includes a tire wear sensor disposed in each of a plurality of wheel wells of the electrified vehicle; displaying the tire wear cost in a currency via the HMI; and wherein the HMI is an instrument panel cluster.

In addition to the foregoing, the described method may include one or more of the following features: monitoring, by the controller, an energy state of a high voltage battery system of the electrified vehicle; receiving, by the controller, electricity cost data; determining, by the controller, an amount of energy required to perform the user selected drive mode; determining, by the controller, an energy cost of performing the user selected drive mode, based on the electricity cost data and the determined amount of energy required to perform the user selected drive mode; and displaying, by the controller, the determined energy cost on the HMI; accessing, by an infotainment unit via a network, current electricity cost data; and displaying, by the controller, the energy cost in a currency.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Figure 1:
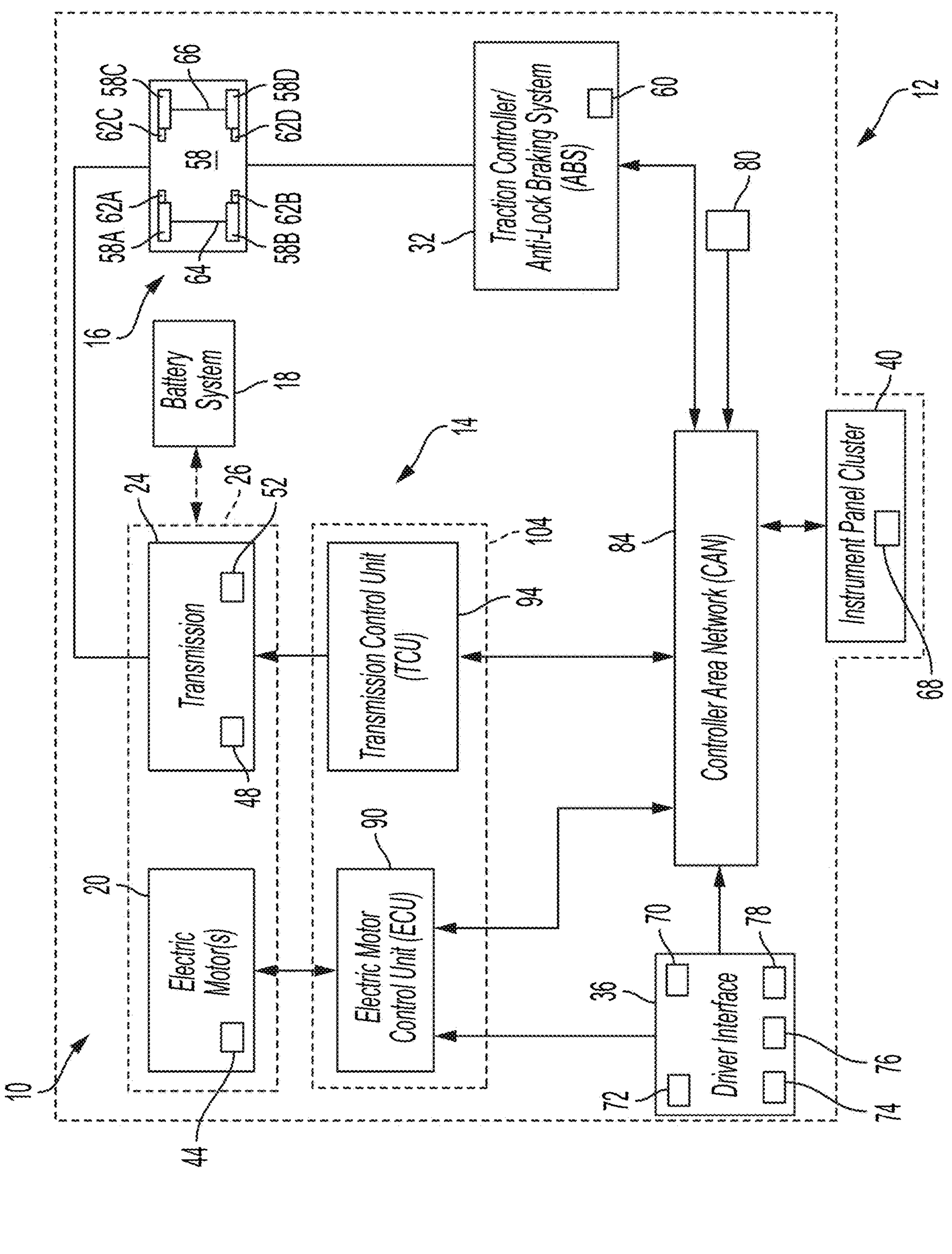
FIG. 1 is a schematic block diagram of an exemplary vehicle system according to the principles of the present disclosure.

As previously discussed, electric vehicles (EVs), such as battery electric vehicles (BEVs) or range extended electric vehicles (REEVs), include electric motors and unconventional drivelines that enable new drive features for the automotive market. However, it may be difficult for a driver to estimate the cost of operating a vehicle in these specialized modes, particularly in terms of reduced tire life and electric vehicle range. Costs may be significant in high performance vehicles that require expensive equipment, such as specialty tires. Accordingly, the present application is generally directed to systems and methods to inform the driver of the cost to perform particular drive features and control the cost using a driver selectable cost limit.

In one example, an EV enables a driver to select drive features such as an Automated Donut Mode, an Automated Drift Mode, and an Automated Burnout Mode. Each of these drive features involves intentionally inducing wheel slip, which can lead to accelerated tire wear and higher battery power usage (reduced range). Accordingly, the vehicle includes a control system to inform the driver of the impact of using these drive features, which can be in the form of reduced EV range, reduced tire life, or cost in the form of a currency. The control system also allows the driver to choose a limit of such impacts, such as a limit to how much reduced range or a limit to the cost in terms of currency. In one example, the vehicle control system provides a notification to the driver that the chosen limit is exceeded, for example via a human machine interface (HMI). In another example, the vehicle control system deactivates the selected drive feature when the chosen limit is exceeded.

In one aspect, the control system estimates impact of the drive features, such as the amount of tire wear, energy consumption, and/or reduced range per use/time. The control system utilizes the infotainment unit (radio) or a connected smart device app to access current equipment (e.g., tire) and energy (e.g., charging station) cost via a network (e.g., internet). For example, a smart device app can use a camera to take a picture of a tire sidewall to automatically find current tire price. Alternatively, a user may manually enter these costs. The control system is configured to display drive feature costs via HMI, such as touchscreen display or instrument panel cluster.

In one example, the control system estimates tire wear and a subsequent tire wear cost for a particular operational mode (e.g., a burnout). The control system may estimate tire wear indirectly or directly. Tire wear is measured indirectly using an algorithm or model to estimate tire wearing using techniques such as artificial neural networks (ANN) or other machine learning. The control system estimator receives inputs of vehicle operating states and tire conditions, such as vehicle speed, wheel rotational speed, tire pressure, and tire vertical load. Tire wear is measured directly utilizing one or more sensors (e.g., millimeter wave radio sensors) installed in the wheel wells of the vehicle.

Tire wear cost is calculated by the control system after determining the tire wear and the cost of the tires. In one example, the infotainment unit or smart device app accesses tire cost information from the internet or other database. Alternatively, the user may manually enter tire cost or a smart device camera may be used to take a picture of the tire sidewall to automatically retrieve tire cost for that particular model of tire.

Once tire cost and tire wear are known, the control system calculates the tire wear cost. In one example, tire wear cost is calculated with the following formula: Cost_tire_wear= ((Tire_Wear_FL/Full_tire_tread_depth)*Cost-replacement-_tire_FL)+((Tire_Wear_FR/Full_tire_tread_depth)*Cost-replacement_tire_FR)+((Tire_Wear_RL/Full_tire_tread_depth)*Cost-replacement_tire_RL)+((Tire_Wear_RR/Full_tire_tread_depth)*Cost-replacement_tire_RR), where FL is the front left tire, FR is the front right tire, RL is the rear left tire, and RR is the rear right tire. In another example, tire wear cost is calculated for each individual tire rather than total cost.

In one example, the control system estimates energy cost for a particular operational mode (e.g., a burnout). To estimate Energy Cost, the control system determines the Energy Consumed during the event and multiplies that by the Energy Rate. In one example, the Energy Consumed is calculated onboard within a propulsion control system, and the Energy Rate is determined using an onboard internet connection or through manual data entry on the HMI. In one example, the energy cost is calculated with the following formula: Energy_Cost ($)=Energy_Consumed (kWh)*Energy_Rate ($/kWh).

In one example, the vehicle is equipped with one or more user selectable specialized drive modes such as, for example, a Track Mode, a Drag Race Mode, a Line Lock Mode, a Donut Mode, and a Drift Mode. The Track Mode is utilized for driving on race tracks, and the Drag Race Mode is utilized for performing a drag race operation. The Line Lock Mode is configured to brake the front tires and spin the rear tires in order to heat the tires for better road grip at launch. For some vehicles, the system can also brake the rear wheels and spin the front tires.

The Donut Mode supports rear-wheel burnouts where the vehicle rear end may swing around. This allows the driver to provide propulsive force exclusively to the rear wheels. The vehicle traction control system is adapted to allow the driver to manage the rate of wheel slip and to allow the rear of the vehicle to pivot around the front wheels. The Drift Mode provides optimal vehicle behavior to support drifting. This allows the driver to select a maximum slip angle that the rear of the vehicle may achieve relative to the direction of travel. Propulsive force is biased to the rear wheels using the front wheels to help maintain the slip limit. The traction control system is adapted to allow the driver to manage the rate of wheel slip and to allow the rear of the vehicle to slip up to the pre-configured limit.

Systems and operations of the specialized modes may be the same or similar to those described in commonly owned, co-pending patent applications Ser. No. 18/499,337, filed on Nov. 1, 2023; Ser. No. 18/499,348, filed on Nov. 1, 2023; Ser. No. 18/499,361, filed on Nov. 1, 2023; Ser. No. 18/499,373, filed on Nov. 1, 2023; and Ser. No. 18/499,385, filed on Nov. 1, 2023, the entire contents of which are incorporated herein by reference thereto.

With initial reference to FIG. 1, an exemplary vehicle system is schematically shown and generally identified at reference numeral 10. In accordance with various aspects of the present disclosure, interactive techniques, referred to herein as a "drive mode" for permitting an exemplary vehicle 12 to perform a specialized operation are implemented utilizing the vehicle system 10. As will be discussed in greater detail below, in one example implementation the interactive mode is initiated upon a vehicle driver selecting a particular mode from an interactive menu displayed on an instrument cluster of the vehicle system. The mode can only be entered based on satisfying a number of vehicle conditions. Once the mode is chosen, a control system is configured to determine the cost (e.g., in currency) of operating the vehicle in the chosen mode, for example, in terms of tire wear, energy consumption, and/or reduced range per use/time.

With continuing reference to FIG. 1, the exemplary vehicle system 10 is associated with an exemplary electrified vehicle 12 and includes an electrified powertrain 14 configured to transfer drive torque to a driveline 16 of the vehicle 12 for propulsion. The electrified powertrain 14 generally comprises a high voltage battery system 18, one or more electric motors 20, and a transmission 24. The one or more electric motors 20 and the transmission 24 can be collectively referred to herein as an electric drive module 26. While the exemplary implementation includes a transmission 24, in some examples the electrified powertrain 14 does not include a transmission.

The vehicle system 10 further includes a traction controller and/or an anti-lock brake system (ABS) 32. While shown together it will be appreciated that the vehicle system can have a dedicated traction control system that operates independent of an anti-lock brake system. The vehicle system 10 further includes a driver interface 36 and an instrument panel or cluster 40. The instrument panel or cluster 40 can include any interface device, such as a driver information center and/or vehicle infotainment system capable of receiving input from a driver.

The electric motor 20 includes an engine speed sensor 44. The transmission 24 includes various transmission speed sensors, such as input and output transmission shaft speed sensors 48 and various shift sensors 52, to provide a signal to an associated control system indicative of a transmission gear selected. The transmission 24 and traction controller 32 are coupled or selectively coupled, directly or indirectly, to one or more wheels 58 of vehicle 12, as is known in the art. In the exemplary vehicle system, all of the wheels 58 are drive wheels that receive torque input. While the motor 20 is described herein as an electric motor, in other examples, the vehicle system 10 can be configured with a conventional internal combustion engine (ICE), or a hybrid electric vehicle.

The wheels 58 are identified individually as front wheels 58A, 58B and rear wheels 58C, 58D. The wheels 58A, 58B, 58C and 58D each have associated sensors 62A, 62B, 62C and 62D, each of which may include a wheel speed sensor and/or a tire wear sensor. In one example, the tire wear sensor is disposed in the vehicle tire well, and may be a millimeter wave radio sensor configured to continuously monitor tread wear. In the example shown, the front wheels 58A and 58B are selectively coupled by a front axle 64. Similarly, the rear wheels 58C and 58D are selectively coupled by a rear axle 66. In the exemplary implementation illustrated, the traction controller 32 is controlled to activate foundation brakes 60.

The instrument panel cluster 40 includes various indicators, such as a specialized mode activate light or indicator 68. As will be described herein with respect to FIGS. 2A-2C, the instrument panel cluster 40 provides a menu driven sequence to the driver to enable a particular specialized mode. The driver interface 36 includes a steering wheel 70 and a brake pedal 72. The driver interface 36 includes a driver input device, e.g., an accelerator pedal 74, for providing a driver input, e.g., a torque request, for the motor 20. The driver interface 36 can further include a park brake 76. The driver interface 36 or vehicle interior also includes a transmission shift request device, such as a shift lever or rotary shifter 78, for the driver to request a desired gear of the transmission 24. The shift lever or rotary shifter 78 can provide conventional transmission options including park, reverse, neutral, drive and low. The vehicle system 10 also includes sensors 80. The sensors 80 can include longitudinal sensor or other equivalent sensor for providing data indicative of whether or not the vehicle 12 is on a grade and the incline or angle of the grade.

One or more controllers are utilized to control the various vehicle components or system discussed above. In one exemplary implementation, various individual controllers are utilized to control the various components/systems discussed herein and are in communication with each other and/or the various components/systems via a local interface 84. In this exemplary implementation, the local interface 84 is one or more buses or other wired or wireless connections, as is known in the art. In the example illustrated in FIG. 1, the local interface 84 is a controller area network (CAN). The CAN 84 may include additional elements or features, which have been omitted for simplicity, such as controllers, buffers (cache) drivers, repeaters and receivers, among many others, to enable communications. Further, the CAN 84 may include address, control and/or data connections to enable appropriate communications among the components/systems described herein.

In the example illustrated in FIG. 1, the vehicle system 10 includes an electric motor control unit (ECU) 90 for controlling the motor 20, and a transmission control unit (TCU) 94 for controlling the transmission 24. Both of the control units 90 and 94 as well as the traction controller 32, driver interface 36, instrument cluster 40 and sensor 80 are in communication with CAN 84 and thus each other. Again, in some examples a transmission 24 and therefore the TCU 94 is not included. It will be appreciated that while individual control units are discussed herein and shown in various Figures, the individual control units may also be optionally implemented in the form of one control unit, such as a powertrain or vehicle control unit, represented by broken line 104 in FIG. 1. Thus, it will be appreciated that while the discussion will continue with reference to the individual controllers discussed above, the discussion is equally applicable to the components of vehicle system 10 being controlled by one controller.

Figure 2A:
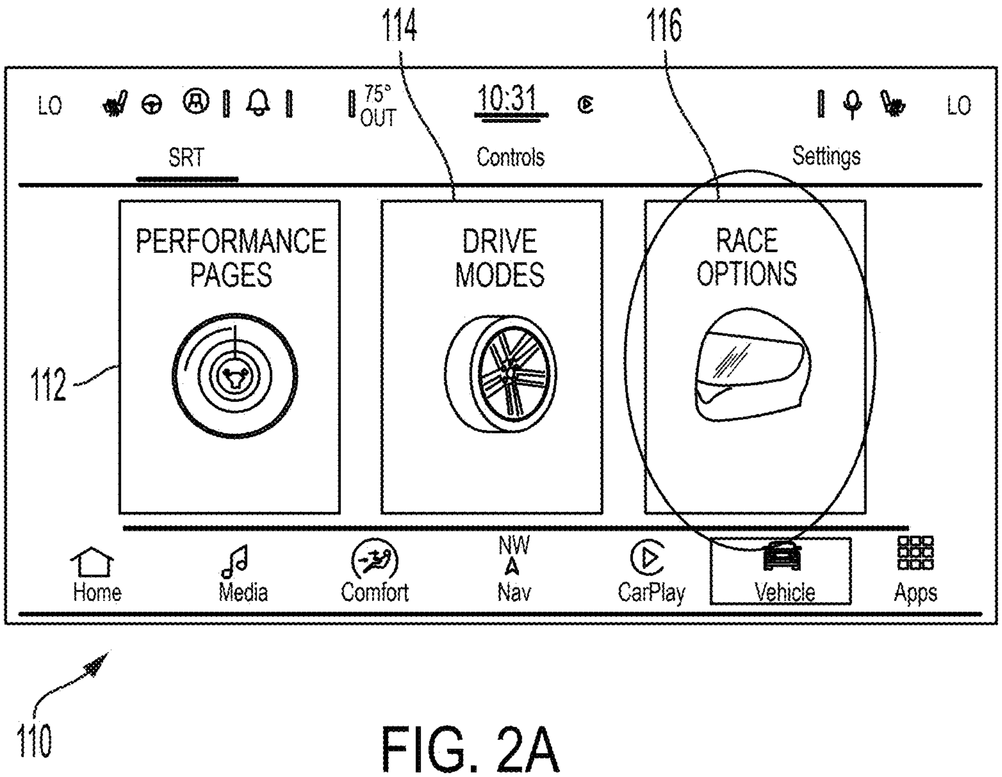
FIGS. 2A-2C are exemplary menu interfaces provided on the instrument panel cluster of the vehicle system of FIG. 1 for entering drive modes according to the principles of the present disclosure.
Figure 2B:
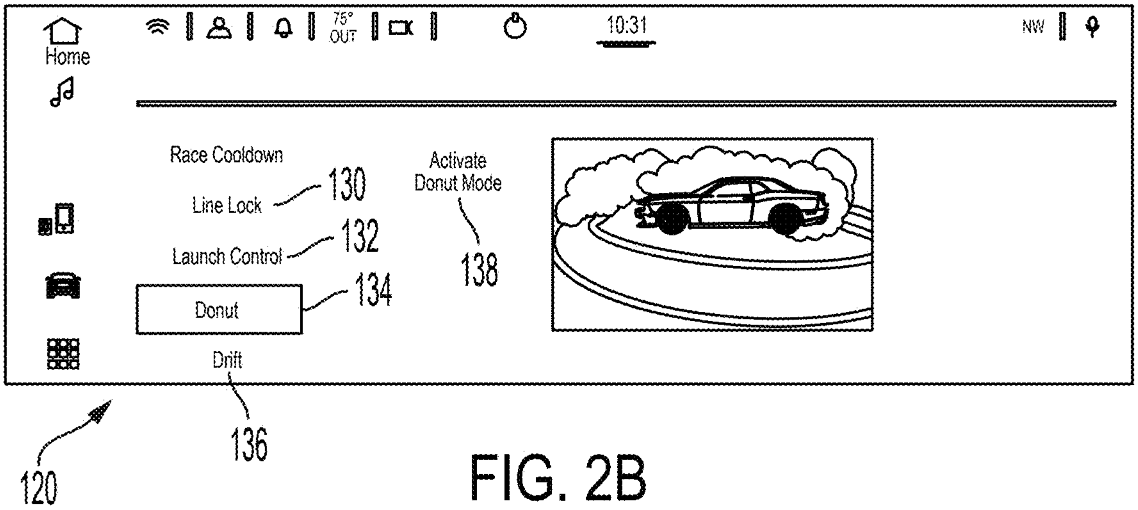
Figure 2C:
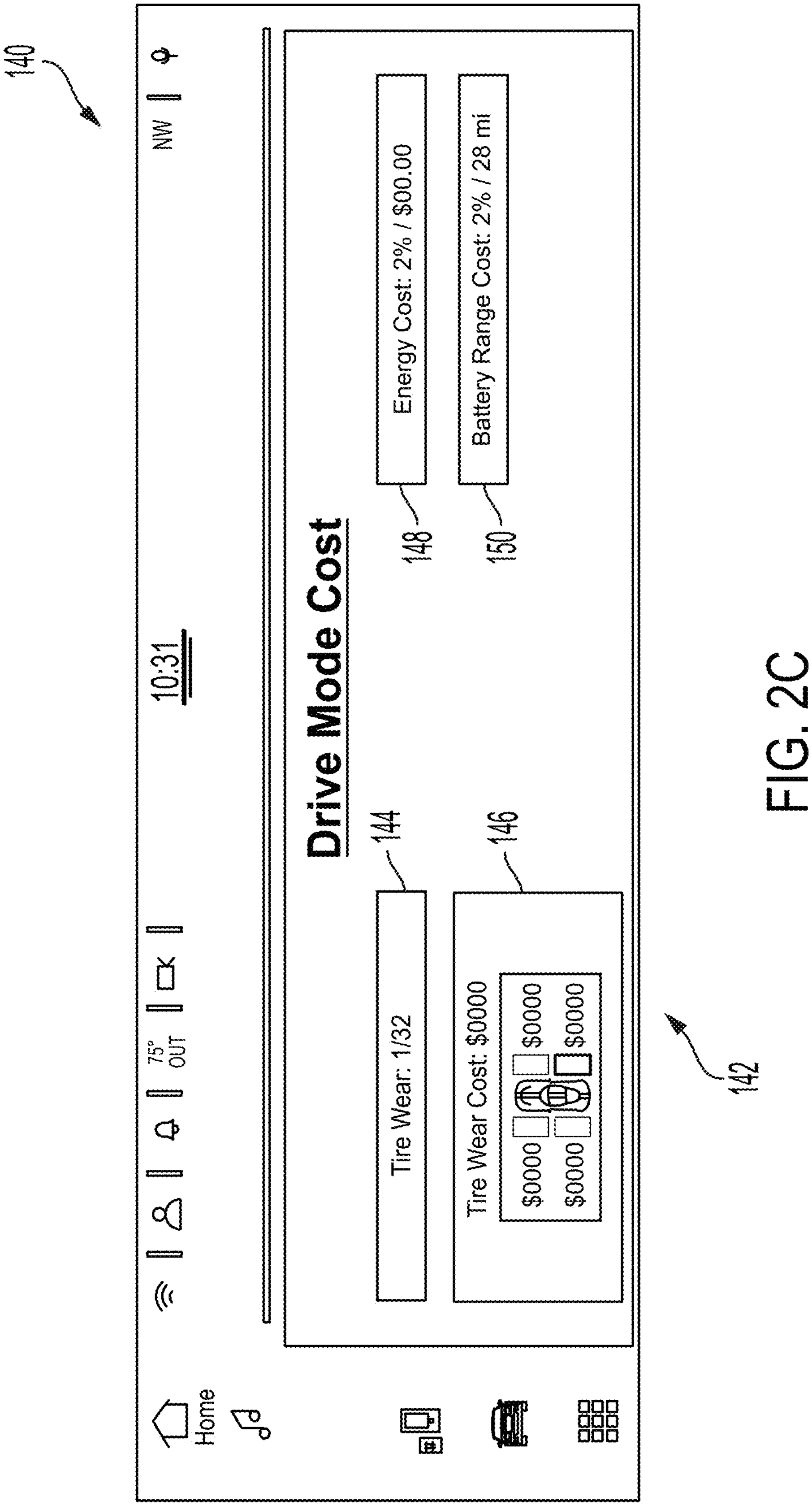

Referring now to FIGS. 2A-2C and with reference back to FIG. 1, an example menu sequence provided to the vehicle driver at the instrument panel cluster 40 will be described. At FIG. 2A, a first menu 110 displays performance pages 112, drive modes 114 and race options 116. As a result of a driver selecting race options 116 at the first menu 110, a second menu 120 (FIG. 2B) is displayed at the instrument panel cluster 40. The second menu 120 can include various modes including a line lock mode 130 (e.g., burnout mode), a launch control mode 132 (e.g., track mode or drag race mode), a donut mode 134, and a drift mode 136. As a result of the driver selecting, for example, the donut mode 134 at the second menu 120, an 'activate mode' option 138 becomes available to select. As a result of the driver selecting the activate mode option 138, a third menu 140 (FIG. 2C) is displayed at the instrument panel cluster 40. The third menu 140 can include instructions (not shown) to the driver with vehicle conditions that must be satisfied for entering donut mode.

The third menu 140 also displays a 'drive mode cost' graphical user interface 142, which displays information related to the cost of operating the vehicle in that particular mode. In the illustrated example, the mode cost interface 142 includes a tire wear 144, a tire wear cost 146, an energy cost 148, and a battery range cost 150. The tire wear 144 displays information related to current tire wear (e.g., remaining tread depth), for example based on data from sensors 62A, 62B, 62C and 62D. Tire wear cost 146 displays information related to the tire wear cost for the selected mode. This may be the projected tire wear cost for operating in the selected mode, or may be the estimated tire wear cost after the selected mode has just been performed. This may also display a total tire wear cost (i.e., all four tires) and/or the tire wear cost for each individual wheel. Energy cost 148 displays information related to the amount of battery energy required to perform the selected mode and the currency cost ($) for that amount of energy used. Battery range cost 150 displays information related to the vehicle range cost (e.g., in distance and/or state of charge) to perform the selected mode. Although not shown, third menu 140 may also enable the driver to manually set a limit to tire wear cost or energy cost. Notifications may be displayed and/or the drive mode disabled if the limit is exceeded. It is appreciated that the menus 110, 120, and 140 illustrated are merely exemplary and may take many different forms.

Figure 3:
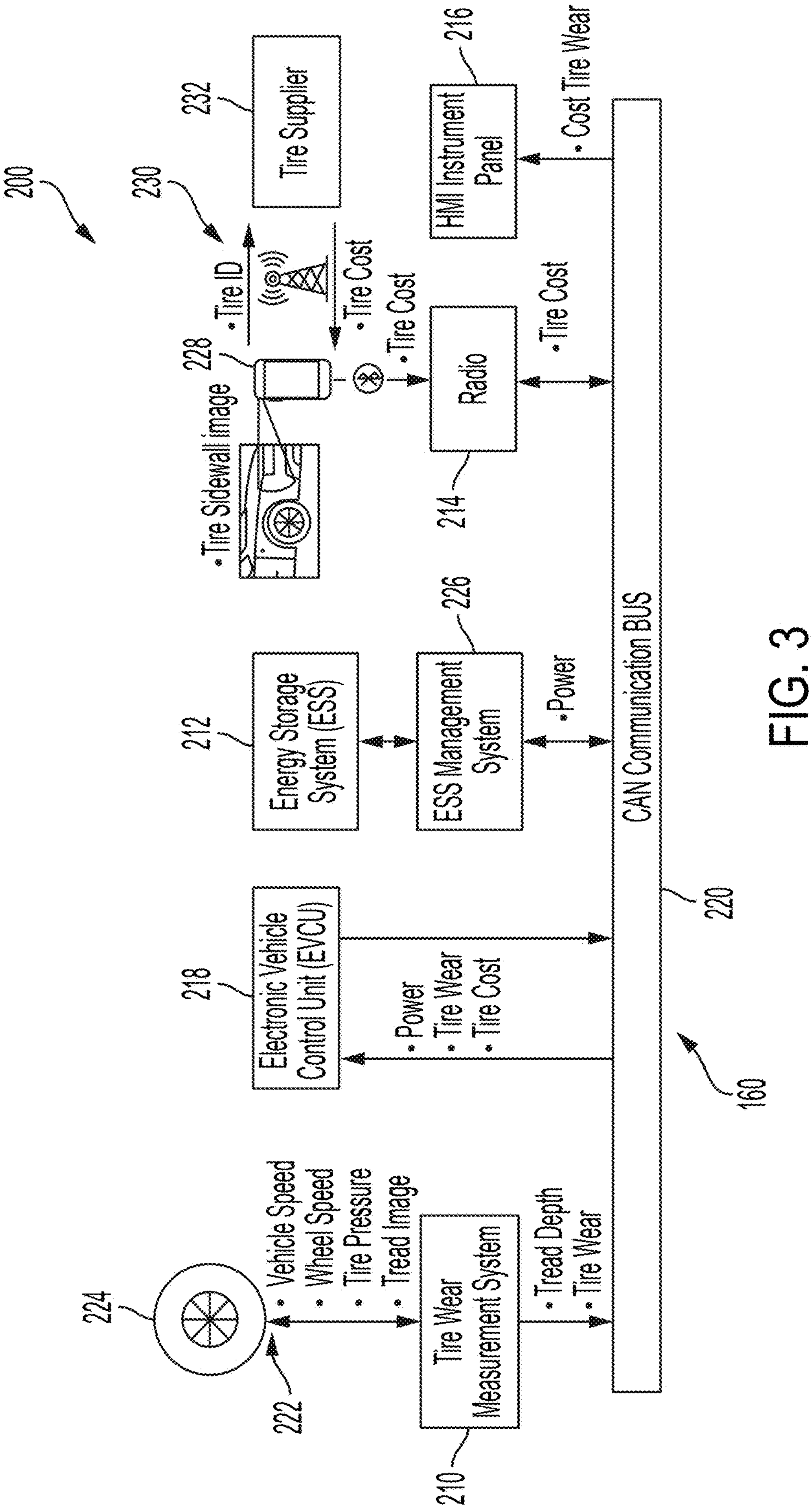
FIG. 3 is a schematic diagram of an example control system configured to provide drive mode cost information according to the principles of the present disclosure.
Figure 4:
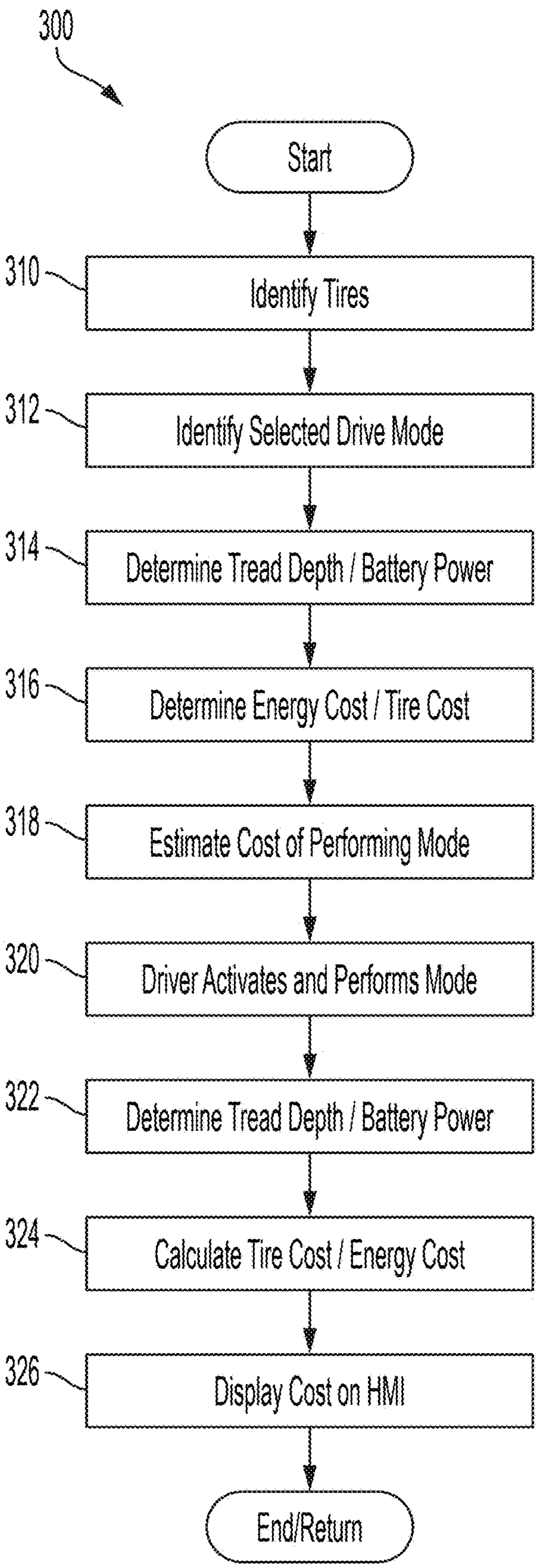
FIG. 4 is an example functional block diagram of a method to provide drive mode cost information according to the principles of the present disclosure.

With reference to FIGS. 3 and 4, systems and methods or techniques are provided for displaying to the driver the costs associated with operating the vehicle in a particular mode, using a control system 160 of the vehicle 12. FIG. 3 illustrates an example architecture 200 of control system 160 configured to display the costs for operating vehicle 12 in a specialized mode. FIG. 4 illustrates a flowchart 300 showing an example operation to display the costs for operating vehicle 12 in a specialized mode.

With particular reference to FIG. 3, the example architecture 200 of control system 160 configured to display operating costs for specialized modes will be described. In the example embodiment, the control system 160 includes a tire wear measurement system 210, an energy storage system (ESS) 212, an infotainment system or radio 214, and an HMI 216 all in signal communication with a controller 218 via a CAN bus 220. The tire wear measurement system 210 includes one or more sensors 222 configured to measure or sense conditions of each vehicle wheel 224 such as, for example, vehicle speed, wheel speed, tire pressure, and tread image. Based on signals from the sensors 222, the tire wear measurement system 210 is configured to determine a tire tread depth and tire wear. This information may then be sent to the controller 218.

The ESS 212 is part of the battery system 18 and includes an ESS management system 226 (e.g., a controller) configured to manage the power of the ESS 212. The ESS management system 226 is configured to measure or sense conditions of the ESS 212, such as state of charge and power usage during the specialized operations.

The radio 214 is configured to wirelessly connect to a personal smart device 228, which may utilize a camera to take a picture of a tire sidewall in order to obtain the model of tire (tire ID) for the vehicle 12. This information may then be sent via network 230 (e.g., internet) to obtain tire price information from a database 232, such as a tire supplier website. Alternatively, the driver may utilize the radio 214 to directly connect to the database 232 via network 230. The tire cost information is then sent to the radio 214 for use by controller 218.

The controller 218 is a supervisory controller of the control system 160, such as an electronic vehicle control unit (EVCU). The controller 218 is configured to receive/provide information from/to the various controllers/systems of the control system 160 via CAN bus 220. In the example embodiment, controller 218 is configured to receive power information from the ESS management system 226, tire wear information from the tire wear measurement system 210, and tire cost information from the radio 214. The controller 218 is configured to determine tire wear cost and/or power usage for specialized operations, as described herein, and provide that information to the driver via HMI 216.

With particular reference to FIG. 4, the example methodology 300 for displaying operating costs for specialized modes will be described. While the components of vehicle 12 are specifically referenced for illustrative/descriptive purposes, it will be appreciated that the method 300 could be applicable to any suitable electrified vehicle. The method 300 begins at 310 where control (e.g., a controller 218) identifies the ID of the tires of the vehicle 12, for example via radio 214 or manual entry. At 312, control identifies the drive mode selected by the driver, for example via second menu 120. At 314, control determines the tread depth of each vehicle tire 58A-D, for example via sensors 222. Control may also determine the remaining power (e.g., SOC) of the ESS 212. At 316, control determines the tire cost at the start of the event. Control may also determine the energy cost to perform the selected mode at the start of the event.

At 318, control estimates a cost of performing the drive mode, such as estimated battery energy usage and tire wear cost, and provides the information to the driver via the HMI 216. As such, the driver can make an informed decision as to whether they want to perform the drive mode. At 320, the driver activates and performs the drive mode. At 322, control determines the tire tread depth at the end of the event. Control may also determine the remaining power of the ESS 212 at the end of the event. At 324, control calculates cost_tire_wear and/or the cost_energy_consumption, as previously described herein. At 326, control displays the cost of tire wear (e.g., in currency) and/or the energy consumption cost (e.g., in vehicle range or currency) on the HMI. Control then ends or returns to 310 for one or more additional cycles.

It will be appreciated that the terms "controller" or "control system" or "module" as used herein refer to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A vehicle system for an electrified vehicle that provides cost information for operating the electrified vehicle in a drive mode, the vehicle system comprising:

an electric traction motor configured to provide drive torque to a plurality of wheels;

a high voltage battery system configured to power the electric traction motor;

one or more sensors configured to monitor tire wear of each wheel of the plurality of wheels;

a human machine interface (HMI) configured to provide a plurality of user selectable drive modes; and a controller configured to:

detect a user selected drive mode;

receive tire cost data for each wheel;

receive tire wear data from the one or more sensors;

determine a tire wear cost for operating the electrified vehicle in the user selected drive mode, based on the tire cost data and the tire wear data; and display the tire wear cost in a currency on the HMI.

2. The vehicle system of claim 1, wherein the user selectable drive modes are configured to intentionally induce wheel slip that can lead to accelerated tire wear.

3. The vehicle system of claim 1, wherein the user selectable drive modes include:

a donut mode configured to support a rear-wheel burnout;

a drift mode configured to support a vehicle drift with a maximum slip angle of a rear of the vehicle relative to the direction of travel; and a line lock mode configured to brake one or more wheels while allowing the remaining wheels to spin for warming thereof.

4. The vehicle system of claim 1, further comprising an infotainment unit configured to access current tire cost data from a database via a network.

5. The vehicle system of claim 1, wherein the one or more sensors includes a tire wear sensor disposed in each of a plurality of wheel wells of the electrified vehicle.

6. The vehicle system of claim 1, wherein the controller is further configured to:

receive a driver set limit to tire wear for the user selected drive mode; and in response to the drive set limit being exceeded, (i) display a notification thereof on the HMI and/or (ii) disable the user selected drive mode.

7. The vehicle system of claim 1, wherein the HMI is an instrument panel cluster.

8. The vehicle system of claim 1, wherein the controller is further configured to:

monitor an energy state of the high voltage battery system;

receive electricity cost data;

determine an amount of energy required to perform the user selected drive mode;

determine an energy cost of performing the user selected drive mode, based on the electricity cost data and the determined amount of energy required to perform the user selected drive mode; and display the determined energy cost on the HMI.

9. The vehicle system of claim 8, further comprising an infotainment unit configured to access current electricity cost data from a database via a network.

10. The vehicle system of claim 8, wherein the energy cost is displayed in a currency.

11. A method for providing cost information for drive mode operation in an electrified vehicle having an electric traction motor, one or more sensors configured to monitor tire wear of vehicle wheels, and a human machine interface (HMI) configured to provide a plurality of user selectable drive modes, the method comprising:

detecting, by a controller and the HMI, a user selected drive mode;

receiving, by the controller, tire cost data for each wheel;

receiving, by the controller, tire wear data from the one or more sensors;

determining, by the controller, a tire wear cost for operating the electrified vehicle in the user selected drive mode, based on the tire cost data and the tire wear data; and displaying, by the controller, the tire wear cost in a currency on the HMI.

12. The method of claim 11, wherein the user selectable drive modes are configured to intentionally induce wheel slip that can lead to accelerated tire wear.

13. The method of claim 11, wherein the user selectable drive modes include:

a donut mode configured to support a rear-wheel burnout;

a drift mode configured to support a vehicle drift with a maximum slip angle of a rear of the vehicle relative to the direction of travel; and a line lock mode configured to brake one or more wheels while allowing the remaining wheels to spin for warming thereof.

14. The method of claim 11, further comprising:

accessing, by an infotainment unit and via a network, current tire cost data from a database.

15. The method of claim 11, wherein the one or more sensors includes a tire wear sensor disposed in each of a plurality of wheel wells of the electrified vehicle.

16. The method of claim 11, further comprising:

receiving, by the controller and the HMI, a driver set limit to tire wear for the user selected drive mode; and in response to the driver set limit being exceeded, (i) displaying a notification thereof on the HMI and/or (ii) disabling the user selected drive mode.

17. The method of claim 11, wherein the HMI is an instrument panel cluster.

18. The method of claim 11, further comprising:

monitoring, by the controller, an energy state of a high voltage battery system of the electrified vehicle;

receiving, by the controller, electricity cost data;

determining, by the controller, an amount of energy required to perform the user selected drive mode;

determining, by the controller, an energy cost of performing the user selected drive mode, based on the electricity cost data and the determined amount of energy required to perform the user selected drive mode; and displaying, by the controller, the determined energy cost on the HMI.

19. The method of claim 18, further comprising: accessing, by an infotainment unit via a network, current electricity cost data.

20. The method of claim 18, further comprising displaying, by the controller, the energy cost in a currency.

* * * * *